United States Patent [19]
Dreiling

[11] Patent Number: 5,845,830
[45] Date of Patent: Dec. 8, 1998

[54] BICYCLE ATTACHABLE SEAT ASSEMBLY FOR CARRYING OBJECTS

[76] Inventor: Neal J. Dreiling, 5942 Rosewood Dr., Great Bend, Kans. 67530

[21] Appl. No.: 703,209

[22] Filed: Aug. 26, 1996

[51] Int. Cl.$^6$ .................. B62J 7/00; B62J 9/00; B62J 11/00
[52] U.S. Cl. .................. 224/415; 224/412; 224/419; 224/425; 224/427; 224/440; 224/445; 224/448; 224/452; 224/453; 224/455
[58] Field of Search .................. 224/412, 415, 224/419–421, 425, 427, 440, 445, 448, 452, 453, 455; 280/202, 288.4

[56] References Cited

U.S. PATENT DOCUMENTS

| | | | |
|---|---|---|---|
| D. 281,964 | 12/1985 | Rudell et al. | D12/111 |
| 1,410,547 | 3/1922 | Bobbitt | 280/282 |
| 1,474,577 | 11/1923 | Bobbitt | 280/282 |
| 2,630,334 | 3/1953 | Ewers | 280/288.4 |
| 2,672,351 | 3/1954 | Kane | 280/289 |
| 3,318,615 | 5/1967 | Chreist, Jr. | 280/289 |
| 3,802,598 | 4/1974 | Burger et al. | 224/415 |
| 4,022,488 | 5/1977 | Likas | 280/289 A |
| 4,030,648 | 6/1977 | Johnson et al. | 224/415 |
| 4,440,331 | 4/1984 | Schimmels | 224/31 |
| 5,234,143 | 8/1993 | Mahvi et al. | 224/31 |
| 5,330,215 | 7/1994 | Bishaf et al. | 280/202 |
| 5,474,270 | 12/1995 | Rixen et al. | 224/448 |

OTHER PUBLICATIONS

Velcro Product News, Velco International Ltd., p. 11, Feb. 1975.

Primary Examiner—Henry J. Recla
Assistant Examiner—Timothy L. Maust
Attorney, Agent, or Firm—Flanagan & Flanagan; John R. Flanagan; John K. Flanagan

[57] ABSTRACT

A bicycle attachable seat assembly includes a seat having a back portion, a bottom portion and a pair of opposite side portions for receiving an object therein. A pair of spaced apart vertical slits are formed in the back portion of the seat. An elongated strap passes through the vertical slits and extends behind a rear side of the back portion of the seat and has opposite first and second ends disposed in front of a front side of the back portion of the seat. The opposite ends of the strap are used to wrap around an object and thereby retain the object in the seat. An object gripping member is disposed through a centrally spaced vertical slot formed in the back portion of the seat and includes a substantially C-shaped member when viewed from a top thereof disposed over the bottom portion of the seat for making gripping contact with the object. An elongated support arm having a pair of opposite first and second end portions is attached to the seat at the first end portion thereof and connects to a clamp at the second end portion thereof. The clamp is for securing the assembly to a bicycle component such as a seat post or the back of a seat. A pair of fasteners move the clamp between a first condition in which the clamp is attached to the bicycle component and a second condition in which the clamp is released from the bicycle component.

21 Claims, 2 Drawing Sheets

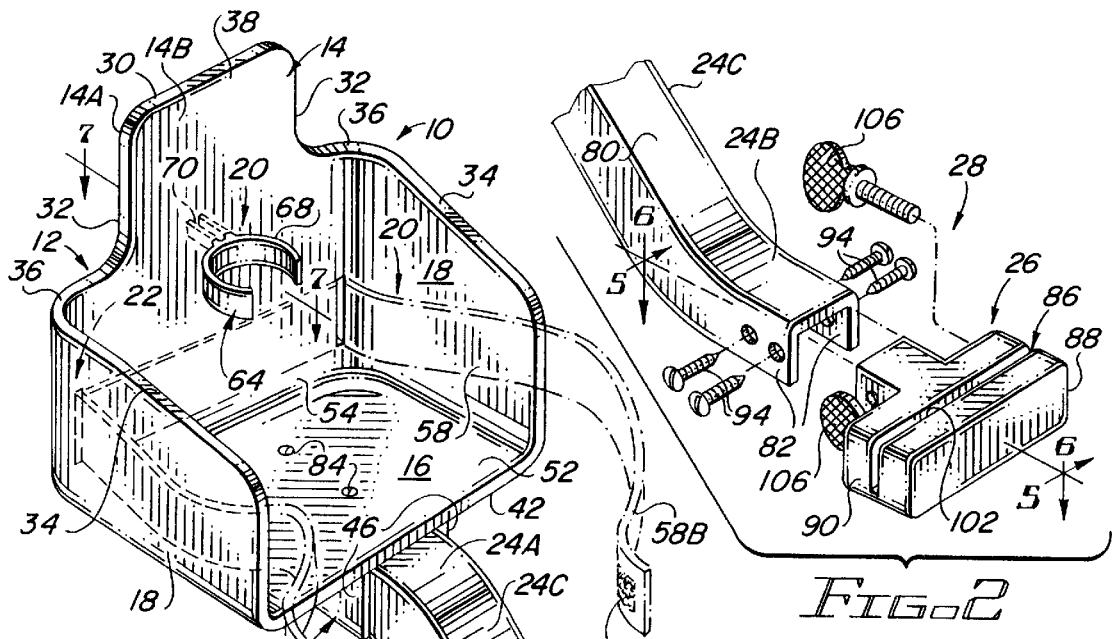
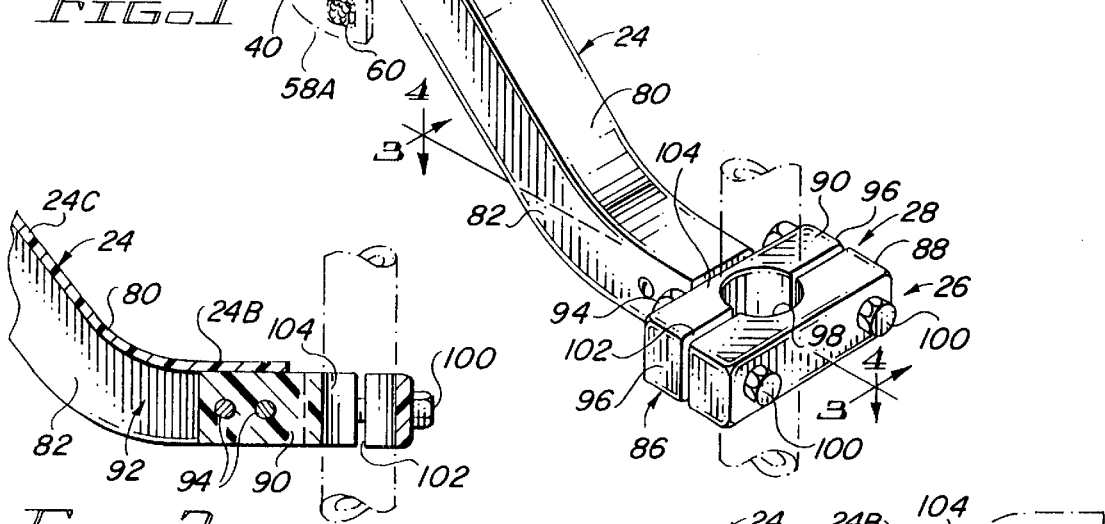
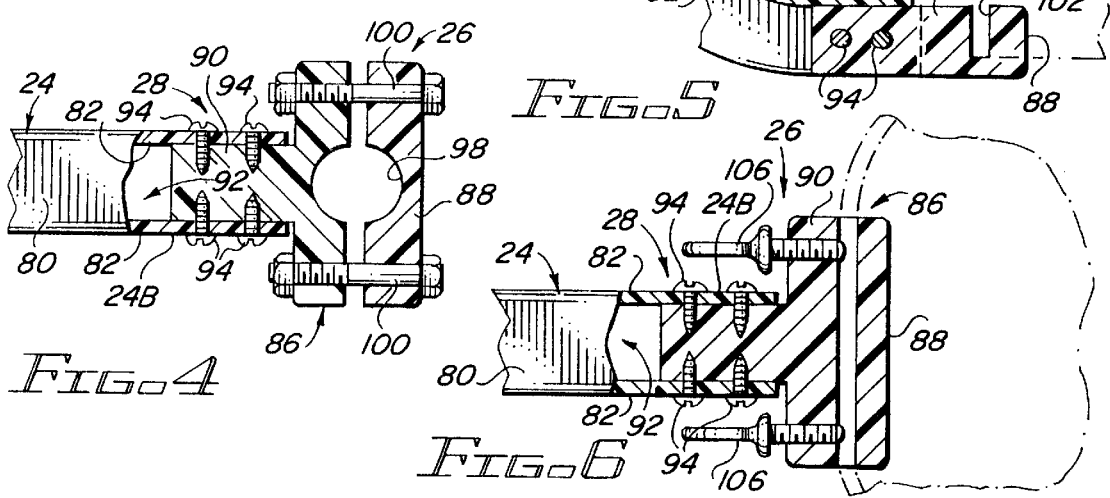

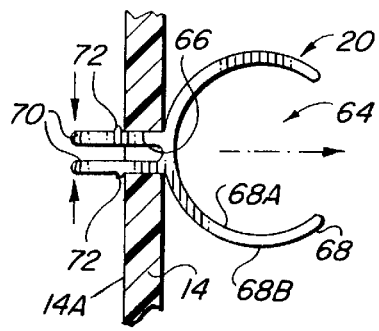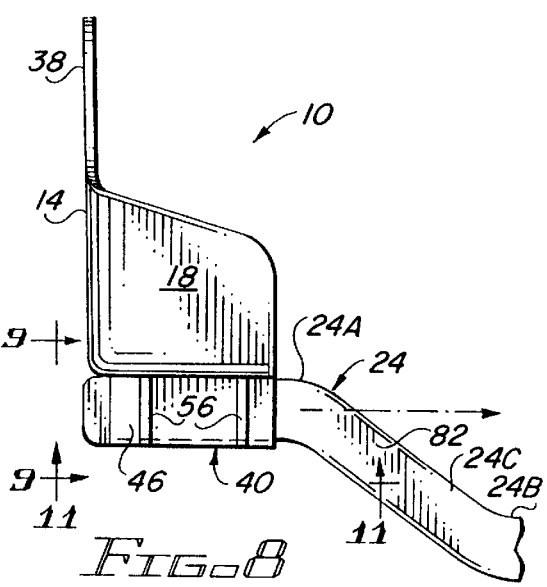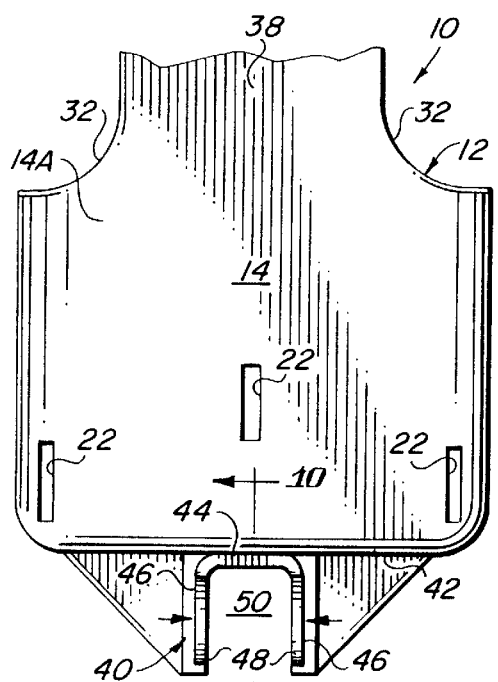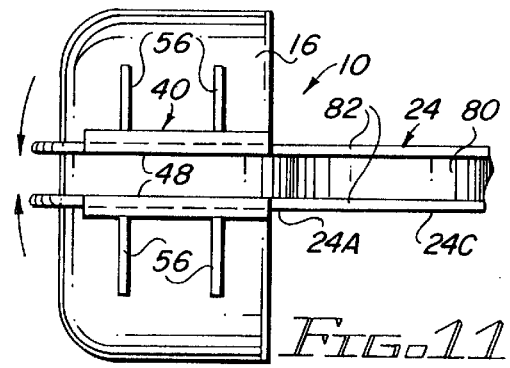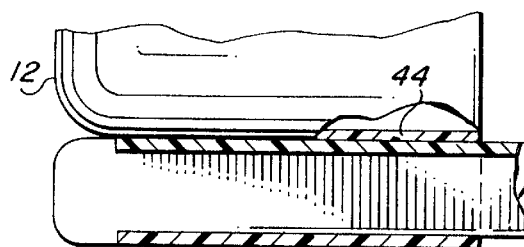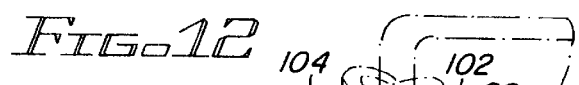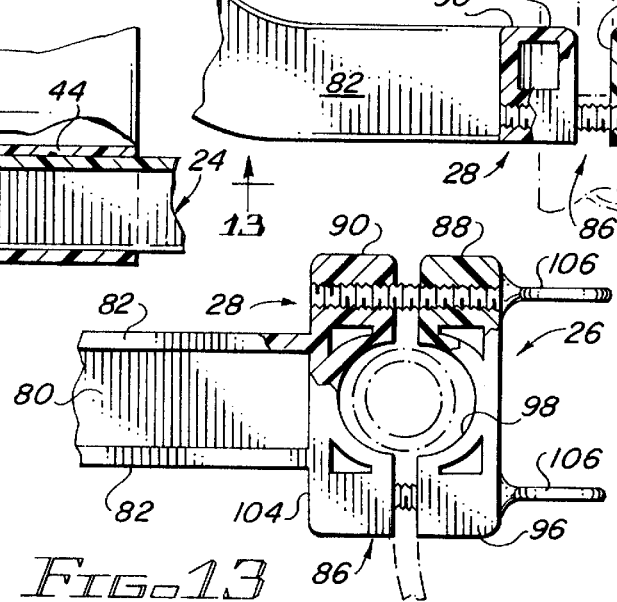

BICYCLE ATTACHABLE SEAT ASSEMBLY FOR CARRYING OBJECTS

BACKGROUND OF THE INVENTION

1. Field of the Invention

The present invention generally relates to bicycle attachment devices and, more particularly, is concerned with a bicycle attachable seat assembly for carrying an object such as a doll or the like on a bicycle.

2. Description of the Prior Art

A variety of bicycle attachment devices have been developed over the years for carrying objects so that a bicycle rider can keep both hands on the handle bars of a bicycle. These devices are generally attachable to a seat or to a seat post or to any other suitable portion of the bicycle. Some of these devices are intended to be used with an object such as a doll or the like so that a child can keep his or her hands on the bicycle handle bars and at the same time carry the object attached to the device.

Representative examples of these bicycle attachment devices are disclosed in U.S. Des. Pat. No. 281,964 to Rudell et al., U.S. Pat. No. 1,410,547 to Bobbitt, U.S. Pat. No. 1,474,577 to Bobbitt, U.S. Pat. No. 2,630,334 to Ewers, U.S. Pat. No. 2,672,351 to Kane, U.S. Pat. No. 3,318,615 to Chreist, Jr., U.S. Pat. No. 3,802,598 to Burger et al., U.S. Pat. No. 4,022,488 to Likas, U.S. Pat. No. 4,440,331 to Schimmels and U.S. Pat. No. 5,234,143 to Mahvi et al. While these prior art bicycle attachment devices appear to be satisfactory in use for the specific purposes for which they were designed, none of them seem to provide a practical solution for a child who desires to carry an object such as a doll or the like on a bicycle or tricycle.

Consequently, a need still exists for a device which provides a more practical solution to the aforementioned problem in the prior art without introducing any new problems in place thereof.

SUMMARY OF THE INVENTION

The present invention provides a bicycle attachable seat assembly for carrying an object such as a doll or the like on a bicycle and which is designed to satisfy the aforementioned need. The bicycle attachable seat assembly of the present invention provides an effective and practical solution for a child who desires to carry an object on a bicycle or tricycle and at the same time keep his or her hands on the bicycle handle bars.

Accordingly, the present invention is directed to a bicycle attachable seat assembly which comprises: (a) a seat having a back portion, a bottom portion and a pair of opposite side portions, the seat being for receiving an object therein; (b) means for restraining the object in the seat; (c) means formed in the back portion of the seat for attaching the restraining means thereto; (d) an elongated support arm having a pair of opposite first and second end portions and being attached to the seat at the first end portion thereof; (e) securing means attached to the second end portion of the support arm; and (f) fastening means coupled to the securing means and being operable to move the securing means between a first condition in which the securing means is attached to a component of a bicycle and a second condition in which the securing means is released from the component of the bicycle.

More particularly, the back portion of the seat has a top edge defining a pair of opposite concave side recesses. Each side portion of the seat has a top edge continuous with the top edge of the back portion and defining a concave top recess. The back portion has a middle extension portion disposed between the side recesses to provide added support for the seat and the object received therein. The seat also has a support arm receiving member integrally attached to and projecting downward from a lower surface of the bottom portion of the seat. The support arm receiving member defines a central fore-and-aft extending channel for receiving the first end portion of the support arm therethrough and in snap fit mating connection therewith.

The restraining means is an elongated strap means having first and second opposite ends with the strap means passing through a pair of vertical slits of the attaching means formed in the back portion of the seat and extending behind a rear side of the back portion of the seat. The first and second ends of the strap means extend in front of a front side of the back portion of the seat and are detachably attachable together for wrapping around and thereby for retaining the object in the seat. The first end of the strap means has a plurality of loop fastening elements disposed on one side thereof. The second end of the strap means has a plurality of hook fastening elements disposed on one side thereof for mateable attachment with the plurality of loop fastening elements on the first end of the strap means.

The restraining means may also be in the form of an object gripping member and the attaching means in the form of a centrally spaced vertical slot formed in the back portion of the seat. The gripping member includes a substantially C-shaped member when viewed from a top thereof disposed over the bottom portion of the seat and having a pair of opposite interior and exterior sides with the interior side being for making gripping contact with the object. The gripping member also includes a pair of spaced apart elongated tabs extending in substantially parallel relation to one another from the exterior side at a center of the C-shaped member and having a pair of knobs with each knob being disposed on a side of one of the tabs facing a direction opposite from the other tab. Each tab is pliable toward the other for insertion through the vertical slot and away from one another for permitting the knobs to make contact with the rear side of the back portion and thereby for retaining the gripping member in place and preventing the tabs from passing back through the vertical slot.

The support arm is substantially rectangular in shape in transverse cross-section and further has a top wall and a pair of opposite side walls. The support arm also has a middle portion disposed between the first and second end portions and being curved in relation to the end portions. The top and side walls of the support arm define a central fore-and-aft extending canal.

The securing means is a clamp movable between first and second conditions and having a clamping portion and a fastening portion forming a substantially T-shaped configuration when viewed from a top thereof with the clamping portion extending in substantially perpendicular relation to the fastening portion. The central fore-and-aft extending canal of the support arm is for receiving the fastening portion therethrough. In one embodiment, the clamping portion has a pair of separated block portions which together define an annular passageway at a center therebetween. The passageway is adapted to receive therethrough a member, such as a substantially cylindrical seat post of a bicycle. The fastening means for this embodiment is a pair of nut and bolt screw fasteners each disposed at a side of the passageway and passing through each block portion and being for tightening the block portions toward one another so as to secure the assembly to the shaft therebetween and being for loosening the block portions away from one another so as to remove the assembly from the shaft.

In another embodiment, the clamping portion of the clamp has an elongated slot defined in a single block portion extending a longitudinal length along a center thereof. The slot is adapted to receive therein a narrow edge, such as that of the back seat of a bicycle. The fastening means for this embodiment is a pair of thumb screw fasteners each disposed adjacent each end of the longitudinal length of the single block portion and in substantially perpendicular relation thereto such that screwing in the thumb screw fasteners causes them to make contact with one side of the narrow edge inserted within the slot so as to secure the assembly to the narrow edge and screwing out the thumb screw fasteners causes them to release from contact with the one side of the narrow edge so as to permit removal of the narrow edge from the slot and thereby remove the assembly therefrom.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to, the attached drawings in which:

FIG. 1 is a perspective view of the bicycle attachable seat assembly of the present invention.

FIG. 2 is an exploded perspective view of a portion of the bicycle attachable seat assembly.

FIG. 3 is a longitudinal sectional view of the assembly taken along line 3—3 of FIG. 1.

FIG. 4 is a top plan view partly in section of the assembly taken along line 4—4 of FIG. 1.

FIG. 5 is a longitudinal sectional view of the assembly taken along line 5—5 of FIG. 2.

FIG. 6 is a top plan view partly in section of the assembly taken along line 6—6 of FIG. 2.

FIG. 7 is a top plan view partly in section of the assembly taken along line 7—7 of FIG. 1.

FIG. 8 is a side elevational view of a portion of the assembly.

FIG. 9 is a rear elevational view of the assembly taken along line 9—9 of FIG. 8.

FIG. 10 is a longitudinal sectional view of the assembly taken along line 10—10 of FIG. 9.

FIG. 11 is a bottom plan view of the assembly taken along line 11—11 of FIG. 8.

FIG. 12 is a longitudinal sectional view of a portion of the assembly.

FIG. 13 is a bottom plan view partly in section of the assembly taken along line 13—13 of FIG. 12.

DETAILED DESCRIPTION OF THE INVENTION

Referring to the drawings and particularly to FIG. 1, there is illustrated a bicycle attachable seat assembly, generally designated 10, of the present invention, for carrying an object such as a doll or the like on a bicycle (hereinafter also including a tricycle and the like). Basically, the bicycle attachable seat assembly 10 includes a seat 12 having a back portion 14, a bottom portion 16 and a pair of opposite side portions 18 with the seat 12 being for receiving the object therein, restraining means 20 for retaining the object in the seat 12, attaching means 22 for attaching the restraining means to the back portion 14 of the seat, an elongated support arm 24 having a pair of opposite first and second end portions 24A, 24B and being attached to the seat 12 at the first end portion 24A, securing means 26 attached to the second end portion 24B of the support arm 24, and fastening means 28 coupled to the securing means 26 and being operable to move the securing means 26 between a first condition in which the securing means 26 is attached to a component of a bicycle and a second condition in which the securing means 26 is released from the component of the bicycle. The bicycle component may be a back of a seat, as shown in phantom in FIGS. 5, 6, 12 and 13, or a seat post, as shown in phantom in FIGS. 1, 3, 12 and 13, or any other suitable portion of the bicycle.

Referring now to FIGS. 1, 8 to 11, the seat 12 is comprised of a substantially rigid plastic material and can be made of any other suitable material and is of a size generally suited to fit a doll or the like but not an infant. All of the portions 14, 16 and 18 of the seat 12 are preferably molded from the same blank of material and each are preferably in the form of a wall but can be of any other suitable form. The back portion 14 of the seat 12 has a top edge 30 defining a pair of opposite concave side recesses 32. Each side portion 18 of the seat 12 has a top edge 34 continuous with the top edge 30 of the back portion 14 and defining a concave top recess 36. The side recesses 32 and top recess 36 reduce the amount of material needed for and thereby the overall weight of the seat 12. The side portions 18 each have a surface area identical to that of the other but less than that of either the back portion 14 or the bottom portion 16. A lower part of the back portion 14 below the side recesses 32 and an imaginary line extending between lower ends of the side recesses 32 has a surface area which is substantially identical to that of the bottom portion 16. The back portion 14 has a middle extension portion 38 disposed between the side recesses 32 to provide added support for the seat 12 and the object received therein.

The seat 12 further has a support arm receiving member 40 integrally attached to and projecting downward from a lower surface 42 of the bottom portion 16 of the seat 12. The support arm receiving member 40 has an elongated top wall 44, a pair of opposite elongated side walls 46 extending in substantially parallel relation to one another and in substantially perpendicular relation to the top wall 44. Each side wall 46 has one of a pair of opposite ledges 48 along a bottom thereof. Each ledge 48 extends inwardly toward the opposite ledge 48 at the bottom of the opposite side wall 46. The top wall 44, side walls 46 and ledges 48 together define a central fore-and-aft extending channel 50 for receiving the first end portion 24A of the support arm 24 therethrough and in snap fit mating connection therewith. The channel 50 extends substantially the full distance from a front end 52 to a rear end 54 of the bottom portion 16 of the seat 12. Each ledge 48 has a transverse width substantially less than the distance between each side wall 46. Each side wall 46 further has a pair of spaced apart reinforcing ribs 56 interconnected therewith and in substantially parallel relation to one another and integrally attached to and projecting downward from the lower surface 42 of the bottom portion 16 and having a substantially triangular shape with a right angle at the point where the side wall 46 meets the lower surface 42 of the bottom portion 16 and with a hypotenuse extending from the bottom of the side wall 46 to a point along the lower surface 42 of the bottom portion 16 spaced inwardly from the point where the bottom portion 16 meets the side portion 18.

Referring now to FIGS. 1 and 9, the restraining means 20 includes an elongated strap 58, as shown in phantom in FIG. 1, having a pair of opposite ends 58A, 58B and passing through each of a pair of spaced apart vertical slits 22 of the attaching means formed in the back portion 14 of the seat 12 adjacent to the side portions 18 and the bottom portion 14 of the seat 12. The strap 58 extends behind a rear side 14A of the back portion 14 of the seat 12 through the slits 22 to its opposite ends 58A, 58B disposed in front of a front side 14B of the back portion 14 of the seat 12. The opposite ends 58A, 58B are attachable together and adapted to wrap around and thereby retain the object in the seat 12. The first end 58A of the strap 58 has a plurality of loop fastening elements 60 disposed on one side thereof, whereas the second end 58B of the strap 58 has a plurality of hook fastening elements 62 disposed on one side thereof for mateable attachment with the plurality of loop fastening elements 60 of the first end of the strap 58. Each strap 58 has a width slightly less than the length of the vertical slits 22 and has a thickness slightly less than the width across the vertical slits 22. Also, the strap 58 has a length which is sufficient to allow enough space on the seat to retain the object between a point of attachment of the ends 58A, 58B of the strap 58 to one another and the front side 14B of the back portion 14 of the seat 12.

Referring now to FIGS. 1, 7 and 9, the restraining means 20 may also be in the form of an object gripping member 64 disposed through a centrally spaced vertical slot 66 formed in the back portion 14 of the seat 12. The gripping member 64 includes a substantially C-shaped member 68 when viewed from a top thereof disposed over the bottom portion 16 of the seat 12 and having a pair of opposite interior and exterior sides 68A, 68B with the interior side 68A being for making gripping contact with the object. The gripping member 64 also includes a pair of spaced apart elongated tabs 70 extending in substantially parallel relation to one another from the exterior side 68B at a center of the C-shaped member 68 and having a pair of knobs 72 with each knob 72 being disposed on a side of one of the tabs 70 facing a direction opposite from the other tab 70. Each tab 70 is pliable toward the other for insertion through the vertical slot 66 and away from one another for permitting the knobs 72 to make contact with the rear side 14A of the back portion 14 and thereby for retaining the gripping member 64 in place and preventing the tabs 70 from passing back through the vertical slot 66. Each tab 70 has a width only slightly less than the vertical distance from one end to an opposite end of the vertical slot 66 and has a thickness only slightly less than the horizontal distance from one side to an opposite side of the vertical slot 66. Each tab 70 further has a length which is the same as the other and is long enough such that a user may comfortably apply fingers thereto for pressing the tabs 70 toward one another in the process of insertion through and removal from the vertical slot 66. The gripping member 64 is comprised of a substantially rigid plastic material similar to that used to make the seat 12 and can be made of any other suitable material. The C-shaped member 68 and the tabs 70 with knobs 72 are preferably molded from the same blank of material. The restraining means 20 may include any one of the above-described embodiments or any combination thereof or any other suitable means for retaining the object in the seat 12.

Referring now to FIGS. 1 to 6, 8 to 13, the support arm 24 is substantially rectangular in shape in transverse cross-section and further has a top wall 80 and a pair of opposite side walls 82. The top wall 80 of the first end portion 24A thereof is attached to the lower surface 42 of the bottom portion 16 of the seat 12 by a pair of spaced apart nut and bolt screw fasteners 84. The support arm 24 further has a middle portion 24C disposed between the first and second end portions 24A, 24B with the middle portion 24C being curved in relation to the end portions 24A, 24B. The first and second end portions 24A, 24B are in substantially parallel relation to one another with the second end portion 24B being at a point in space lower than the first end portion 24A. The support arm 24 is comprised of a substantially rigid plastic material and can be made of any other suitable material.

The securing means 26 is a clamp 86 movable between first and second conditions and having a clamping portion 88 and a fastening portion 90 forming a substantially T-shaped configuration when viewed from a top thereof with the clamping portion 88 extending in substantially perpendicular relation to the fastening portion 90. The clamping portion 88 and the fastening portion 90 each have a substantially rectangular shape in cross-section. The top wall 80 and side walls 82 of the support arm 24 define a central fore-and-aft extending canal 92 for receiving the fastening portion 90 of the clamp 86 of the securing means 26 therethrough. The fastening portion 90 of the clamp 86 is attached to the side walls 82 of the support arm 24 by a plurality of screws 94. The clamp 86 is comprised of a substantially rigid plastic material and can be made of any other suitable material.

The clamping portion 88 of the clamp 86, in one embodiment, has a pair of separated block portions 96 which together define an annular passageway 98 at a center therebetween. The passageway 98 is for receiving therethrough a substantially cylindrical shaft, such as a seat post, shown in phantom in FIGS. 1, 3, 12 and 13, of a bicycle component. The fastening means 28 for this embodiment is a pair of nut and bolt screw fasteners 100 each disposed at a side of the passageway 98 and passing through each block portion 96 and being for tightening the block portions 96 toward one another so as to secure the assembly 10 to the shaft of the bicycle component therebetween and being for loosening the block portions 96 away from one another so as to remove the assembly 10 from the shaft of the bicycle component. The block portions 96 also receive therebetween a narrow edge, such as the back of a seat, as shown in phantom in FIGS. 5, 6, 12 and 13, of a bicycle component and, in this instance, the nut and bolt screw fasteners 100 tighten the block portions 96 toward one another so as to secure the assembly 10 to the narrow edge of the bicycle component therebetween above the nut and bolt screw fasteners 100 and loosen the block portions 96 away from one another for removal of the narrow edge of the bicycle component so as to remove the assembly 10 therefrom. Each block portion 96 is also substantially a mirror image of the other.

The clamping portion 88 of the clamp 86, in another embodiment, has an elongated slot 102 defined in a single block portion 104 extending a longitudinal length along a center thereof. The slot 102 is for receiving therein a narrow edge, such as the back of a seat, as shown in phantom in FIGS. 5, 6, 12 and 13, of a bicycle component. The fastening means 28 for this embodiment is a pair of thumb screw fasteners 106 each disposed adjacent each end of the longitudinal length of the single block portion 104 and in substantially perpendicular relation thereto such that screwing in the thumb screw fasteners 106 causes them to make contact with one side of the narrow edge of the bicycle component inserted within the slot 102 so as to secure the assembly 10 to the narrow edge of the bicycle component and screwing out the thumb screw fasteners 106 causes them to release from contact with the one side of the narrow edge of the bicycle component so as to permit removal of the narrow edge from the slot 102 and thereby remove the assembly 10 therefrom. The slot 102 generally has a depth of more than half of but less than the full transverse width of the single block portion 104.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A bicycle attachable seat assembly for carrying an object, said assembly comprising:
    (a) a seat having a back portion, a bottom portion and a pair of opposite side portions, said seat being for receiving an object therein;
    (b) means for restraining the object in said seat;
    (c) means formed in said back portion of said seat for attaching said restraining means thereto;
    (d) an elongated support arm having a pair of opposite first and second end portions and being attached to said seat at said first end portion thereof;
    (e) securing means attached to said second end portion of said support arm; and
    (f) fastening means coupled to said securing means and being operable to move said securing means between a first condition in which said securing means is attached to a component of a bicycle and a second condition in which said securing means is released from the component of the bicycle;
    (g) wherein said securing means is a clamp movable between said first and second conditions and having a clamping portion and a fastening portion forming a substantially T-shaped configuration when viewed from a top thereof, said clamping portion extending in substantially perpendicular relation to said fastening portion, said clamping portion and said fastening portion each having a substantially rectangular shape in cross-section;
    (h) wherein said support arm is substantially rectangular in shape in transverse cross-section and further has a too wall and a pair of spaced apart opposite side walls defining a central fore-and-aft extending canal for receiving an end of a T-shaped fastening portion of said securing means therethrough.

2. The assembly of claim 1 wherein said back portion of said seat has a top edge defining a pair of opposite concave side recesses spaced inwardly from said opposite side portions of said seat.

3. The assembly of claim 2 wherein each said side portion of said seat has a top edge continuous with said top edge of said back portion and defining a concave top recess.

4. The assembly of claim 1 wherein:
    said attaching means includes a pair of slits formed in said back portion of said seat adjacent to one of said side portions and to said bottom portion of said seat; and
    said restraining means includes an elongated strap means having opposite first and second ends, said strap means passing through said slits formed in said back portion of said seat and passing therefrom behind a rear side of said back portion of said seat, said strap means at said first and second ends thereof disposed in front of a front side of said back portion of said seat being adapted for wrapping around and thereby for retaining the object in said seat.

5. The assembly of claim 4 wherein at least said first end of said strap means has a plurality of loop fastening elements disposed on one side thereof.

6. The assembly of claim 5 wherein at least said second end of said strap means has a plurality of hook fastening elements disposed on one side thereof for mateable attachment with said plurality of loop fastening elements on said one side of said first end of said strap means.

7. The assembly of claim 1 wherein said seat further has a support arm receiving member integrally attached to and projecting downward from a lower surface of said bottom portion of said seat, said support arm receiving member having an elongated top wall, a pair of opposite elongated side walls, said side walls being spaced apart from one another and extending in substantially parallel relation to one another and in substantially perpendicular relation to said top wall, each said side wall having one of a pair of opposite ledges along a bottom thereof, each said ledge extending inwardly toward said opposite ledge at said bottom of said opposite side wall, said top wall, side walls and ledges together defining a central fore-and-aft extending channel for receiving said first end portion of said support arm therethrough and in snap fit mating connection therewith.

8. The assembly of claim 7 wherein each said side wall of said support arm receiving member of said seat has a pair of spaced apart reinforcing ribs interconnected therewith and in substantially parallel relation to one another and integrally attached to and projecting downward from said lower surface of said bottom portion of said seat.

9. The assembly of claim 1 wherein said support arm is substantially rectangular in shape in transverse cross-section and further has a top wall and a pair of spaced apart opposite side walls, said top wall of said first end portion thereof being attached to a lower surface of said bottom portion of said seat.

10. The assembly of claim 1 wherein said support arm further has a middle portion disposed between said first and second end portions, said middle portion being curved in relation to said first and second end portions.

11. The assembly of claim 1 wherein said fastening portion of said clamp of said securing means is attached to said side walls of said support arm by a plurality of screws.

12. The assembly of claim 1 wherein said clamping portion of said clamp of said securing means has a pair of separated block portions together defining an annular passageway at a center therebetween, said passageway for receiving therethrough a substantially cylindrical shaft of a bicycle component.

13. The assembly of claim 12 wherein said fastening means is a pair of nut and bolt screw fasteners, each said nut and bolt screw fastener being disposed at a side of said passageway and passing through each said block portion for tightening said block portions toward one another so as to secure said assembly to the shaft of the bicycle component therebetween and for loosening said block portions away from one another so as to remove said assembly from the shaft of the bicycle component.

14. The assembly of claim 1 wherein said clamping portion of said clamp of said securing means has a pair of separated block portions for receiving therebetween a narrow edge of a bicycle component.

15. The assembly of claim 14 wherein said fastening means is a pair of nut and bolt screw fasteners, each said nut and bolt screw fastener being disposed adjacent each end of said clamping portion and passing through each of said block portions and being for tightening said block portions toward one another so as to secure said assembly to the narrow edge of the bicycle component therebetween above said nut and bolt screw fasteners and being for loosening said block portions away from one another for removal of the narrow edge of the bicycle component so as to remove said assembly therefrom.

16. The assembly of claim 1 wherein said clamping portion of said clamp of said securing means defines an elongated slot defined in a single block portion, said slot extending a longitudinal length along a center of said single block portion and for receiving therein a narrow edge of a bicycle component.

17. A bicycle attachable seat assembly for carrying an object, said assembly comprising:

(a) a seat having a back portion, a bottom portion and a pair of opposite side portions, said seat being for receiving an object therein;

(b) means for restraining the object in said seat;

(c) means formed in said back portion of said seat for attaching said restraining means thereto;

(d) an elongated support arm having a pair of opposite first and second end portions and being attached to said seat at said first end portion thereof;

(e) securing means attached to said second end portion of said support arm; and (f) fastening means coupled to said securing means and being operable to move said securing means between a first condition in which said securing means is attached to a component of a bicycle and a second condition in which said securing means is released from the component of the bicycle;

(g) wherein said securing means is a clamp movable between said first and second conditions and having a clamping portion and a fastening portion forming a substantially T-shaped configuration when viewed from a top thereof, said clamping portion extending in substantially perpendicular relation to said fastening portion, said clamping portion and said fastening portion each having a substantially rectangular shape in cross-section;

(h) wherein said clamping portion of said clamp of said securing means defines an elongated slot defined in a single block portion, said slot extending a longitudinal length along a center of said single block portion and for receiving therein a narrow edge of a bicycle component;

(i) wherein said fastening means is a pair of thumb screw fasteners, each said thumb screw fastener being disposed adjacent each end of said longitudinal length of said block portion of said clamping portion and in substantially perpendicular relation thereto such that screwing in said thumb screw fasteners causes them to make contact with one side of the narrow edge of the bicycle component inserted within said slot so as to secure said assembly to the narrow edge of the bicycle component and screwing out said fasteners causes them to release from contact with the one side of the narrow edge of the bicycle component so as to permit removal of the narrow edge from said slot and thereby remove said assembly therefrom.

18. A bicycle attachable seat assembly for carrying an object, said assembly comprising:

(a) a seat having a back portion, a bottom portion and a pair of opposite side portions, said seat being for receiving an object therein;

(b) means for restraining the object in said seat;

(c) means forming a vertical slot centrally spaced in said back portion of said seat for attaching said restraining means to said back portion of said seat;

(d) an elongated support arm having a pair of opposite first and second end portions and being attached to said seat at said first end portion thereof;

(e) securing means attached to said second end portion of said support arm; and (f) fastening means coupled to said securing means and being operable to move said securing means between a first condition in which said securing means is attached to a component of a bicycle and a second condition in which said securing means is released from the component of the bicycle;

(g) wherein said restraining means is an object gripping member disposed through said back portion of said seat, said object gripping member including (i) a substantially C-shaped member when viewed from a top thereof disposed over said bottom portion of said seat and having a pair of opposite interior and exterior sides, said interior side being for making gripping contact with the object, and (ii) a pair of spaced apart elongated tabs extending in substantially parallel relation to one another from said exterior side at a center of said C-shaped member and having a pair of knobs, each said knob being disposed on a side of one of said tabs facing a direction opposite from the other said tab, said tabs being pliable toward one another for insertion through said vertical slot formed in said back portion of said seat and away from one another for permitting said knobs to make contact with a rear side of said back portion and thereby for retaining said object gripping member in place and preventing said tabs from passing back through said vertical slot formed in said back portion of said seat.

19. The assembly of claim 18 wherein:

said back portion of said seat has a pair of spaced apart vertical slits formed therein adjacent to one of said side portions and to said bottom portion of said seat; and said restraining means is an elongated strap having opposite first and second ends, said strap passing through said vertical slits formed in said back portion of said seat and extending between said slits behind a rear side of said back portion of said seat, said opposite ends of said strap being disposed in front of a front side of said back portion of said seat for wrapping around and thereby for retaining the object in said seat.

20. The assembly of claim 19 wherein a first of said opposite ends of said straps of said restraining means has a plurality of loop fastening elements disposed on one side thereof.

21. The assembly of claim 20 wherein a second of said opposite ends of said straps of said restraining means has a plurality of hook fastening elements disposed on one side thereof for mateable attachment with said plurality of loop fastening elements of said first strap of said restraining means.

* * * * *